(12) United States Patent
Toyoda et al.

(10) Patent No.: US 6,630,953 B1
(45) Date of Patent: Oct. 7, 2003

(54) FLICKER CONTROL IMAGING APPARATUS

(75) Inventors: Keiji Toyoda, Hamamatsu (JP); Toshiyuki Sano, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/353,633

(22) Filed: Jul. 15, 1999

(30) Foreign Application Priority Data

Jul. 24, 1998 (JP) .......................................... 10-210097
May 21, 1999 (JP) .......................................... 11-142392

(51) Int. Cl.[7] ................................................. H04N 9/73
(52) U.S. Cl. ................................................. 348/226.1
(58) Field of Search .......................... 348/223.1, 224.1, 348/222.1, 226.1, 227.1, 225.1, 910

(56) References Cited

U.S. PATENT DOCUMENTS 5,038,205 A * 8/1991 Kondo et al. ............. 348/225.1
5,204,741 A   4/1993 Sakaguchi
5,319,449 A * 6/1994 Saito et al. ............... 348/223.1
5,465,116 A * 11/1995 Suzuki .................... 348/223.1

FOREIGN PATENT DOCUMENTS

| EP | 0 411 318 | 2/1991 |
| EP | 0 488 442 | 6/1992 |
| EP | 0 513 976 | 11/1992 |
| EP | 0 644 687 | 3/1995 |
| EP | 0 774 865 | 5/1997 |

* cited by examiner

*Primary Examiner*—Tuan Ho
(74) *Attorney, Agent, or Firm*—Louis Woo

(57) ABSTRACT

In an imaging apparatus, at least one picture division signal is generated. Every picture represented by a video signal is divided into at least first and second areas in response to the picture division signal. Detection is made as to a mean luminance of the first area and a mean luminance of the second area. A flicker in the first area is corrected to derive a first correction-resultant area in response to the mean luminance of the first area. A flicker in the second area is corrected to derive a second correction-resultant area in response to the mean luminance of the second area. The first correction-resultant area and the second correction-resultant area are combined into a correction-resultant picture.

8 Claims, 14 Drawing Sheets

FLICKER CONTROL IMAGING APPARATUS

BACKGROUND OF THE INVENTION

1. Field of the Invention

This invention generally relates to an imaging apparatus or a solid-state imaging apparatus which can be used in, for example, a video camera system. This invention particularly relates to an imaging apparatus or a solid-state imaging apparatus having a function of suppressing a flicker in images represented by a video signal. Furthermore, this invention relates to a video-signal processing circuit for suppressing a flicker which can be used in an imaging apparatus.

2. Description of the Related Art

In NTSC, a field period which equals the reciprocal of a field frequency is ⅟₆₀ sec, that is, 16.6 ms. Light generated by a fluorescent lamp powered by 50-Hz AC power iteratively goes on and off at a period of 10 ms. In some cases, an object whose image is taken by an NTSC video camera is illuminated with a fluorescent lamp powered by 50-Hz AC power. In these cases, pictures represented by the output signal of the video camera flicker at a period of 50 ms (a 3-field-corresponding period) which equals the least common multiple of 16.6 ms and 10 ms.

A known flicker correcting system processes a video signal field by field. The known flicker correcting system tends to be insufficiently effective to a flicker which occurs in only a portion of a 1-field area.

SUMMARY OF THE INVENTION

It is a first object of this invention to provide an imaging apparatus able to effectively suppress a flicker which occurs in only a portion of a 1-field area or a 1-frame area.

It is a second object of this invention to provide a video-signal processing circuit able to effectively suppress a flicker which occurs in only a portion of a 1-field area or a 1-frame area.

A first aspect of this invention provides an imaging apparatus comprising first means for generating at least one picture division signal; second means for dividing every picture represented by a video signal into at least first and second areas in response to the picture division signal generated by the first means; third means for detecting a mean luminance of the first area and a mean luminance of the second area; fourth means for correcting a flicker in the first area to derive a first correction-resultant area in response to the mean luminance of the first area which is detected by the third means; fifth means for correcting a flicker in the second area to derive a second correction-resultant area in response to the mean luminance of the second area which is detected by the third means; and sixth means for combining the first correction-resultant area and the second correction-resultant area into a correction-resultant picture.

A second aspect of this invention is based on the first aspect thereof, and provides an imaging apparatus wherein the third means comprises means for detecting the mean luminance of the first and the mean luminance of the second areas in response to the picture division signal generated by the first means.

A third aspect of this invention is based on the first aspect thereof, and provides an imaging apparatus wherein the fourth means comprises a first video amplifier for amplifying the video signal corresponding to the first area at a first gain, and means for controlling the first gain in response to the mean luminance of the first area which is detected by the third means, and wherein the fifth means comprises a second video amplifier for amplifying the video signal corresponding to the second area at a second gain, and means for controlling the second gain in response to the mean luminance of the second area which is detected by the third means.

A fourth aspect of this invention is based on the first aspect thereof, and provides an imaging apparatus wherein the first means comprises means for setting the picture division signal to make inconspicuous a boundary between the first correction-resultant area and the second correction-resultant area in the correction-resultant picture.

A fifth aspect of this invention is based on the first aspect thereof, and provides an imaging apparatus wherein the first means comprises means for setting the picture division signal to make movable a boundary between the first area and the second area.

A sixth aspect of this invention is based on the first aspect thereof, and provides an imaging apparatus wherein the fourth means and the fifth means comprise a common video amplifier for amplifying the video signal at a controllable gain, means for, when the video signal corresponds to the first area, controlling the gain of the video amplifier in response to the mean luminance of the first area which is detected by the third means, and means for, when the video signal corresponds to the second area, controlling the gain of the video amplifier in response to the mean luminance of the second area which is detected by the third means.

A seventh aspect of this invention is based on the first aspect thereof, and provides an imaging apparatus further comprising seventh means for deciding whether or not a flicker is present in the first area in response to the mean luminance of the first area which is detected by the third means; eighth means for deciding whether or not a flicker is present in the second area in response to the mean luminance of the second area which is detected by the third means; and ninth means for controlling the picture division signal generated by the first means to move a boundary between the first area and the second area in response to a result of the decision by the seventh means and a result of the decision by the eighth means.

An eighth aspect of this invention provides a video-signal processing circuit comprising first means for dividing every picture represented by a video signal into first and second areas; second means for processing the video signal which corresponds to the first area to correct a flicker in the first area; and third means for processing the video signal which corresponds to the second area to correct a flicker in the second area.

A ninth aspect of this invention is based on the eighth aspect thereof, and provides a video-signal processing circuit further comprising fourth means for changing a boundary between the first area and the second area.

A tenth aspect of this invention is based on the eighth aspect thereof, and provides a video-signal processing circuit further comprising fourth means for detecting whether or not a flicker is present in the first area; fifth means for detecting whether or not a flicker is present in the second area; and sixth means for changing a boundary between the first area and the second area in response to a result of the detection by the fourth means and a result of the detection by the fifth means.

DESCRIPTION OF THE PREFERRED EMBODIMENTS

A prior-art solid-state imaging apparatus will be explained below for a better understanding of this invention.

Figure 1:
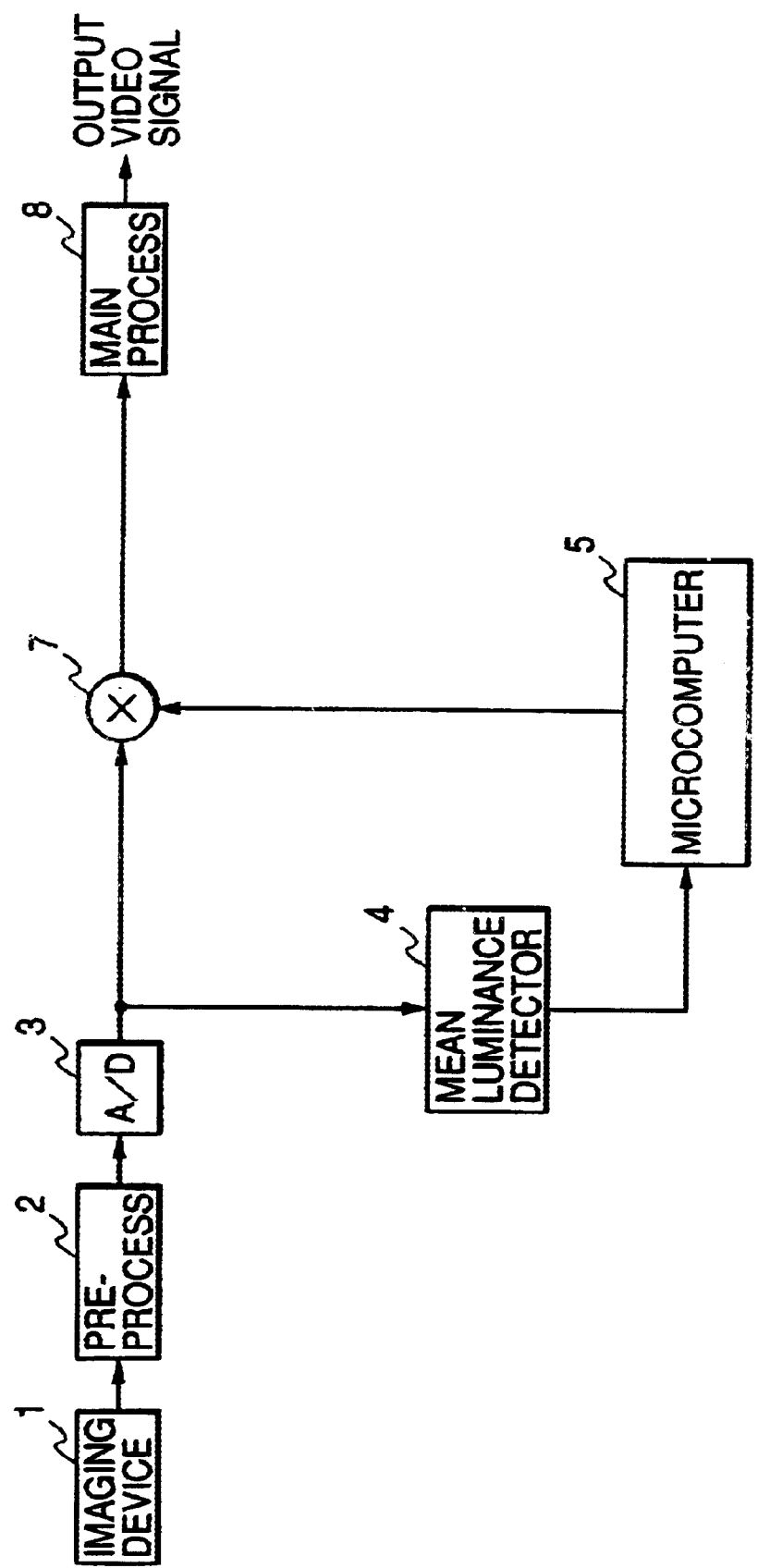
FIG. 1 is a block diagram of a prior-art solid-state imaging apparatus.

With reference to FIG. 1, a prior-art solid-state imaging apparatus includes a CCD-based imaging device 1 which outputs an analog video signal to a pre-processing portion 2. The pre-processing portion 2 subjects the analog video signal to pre-processes such as CDS and AGC. The pre-processing portion 2 outputs the resultant analog video signal to an A/D converter 3. The A/D converter 3 changes the output signal of the pre-processing portion 2 into a corresponding digital video signal. The A/D converter 3 outputs the digital video signal to a mean luminance detector 4 and a multiplier 7. The device 7 multiplies the digital video signal by a variable gain factor. In an analog view, the multiplier 7 acts as an amplifier having a variable gain.

In the prior-art solid-state imaging apparatus of FIG. 1, the mean luminance detector 4 calculates a mean luminance (a mean brightness) of every field represented by the digital video signal outputted from the A/D converter 3. The mean luminance detector 4 informs a microcomputer 5 of the calculated mean luminance of every field. The microcomputer 5 determines a desired gain factor on the basis of the calculated mean luminance of every field. The desired gain factor is chosen to suppress or correct a flicker in images represented by the digital video signal outputted from the A/D converter 3. The microcomputer 5 sets the desired gain factor in the multiplier (the amplifier) 7. The device 7 multiplies the output signal of the A/D converter 3 by the desired gain factor, suppressing or correcting a flicker in images represented by the output signal of the A/D converter 3. The multiplier 7 outputs a resultant digital video signal to a main signal processing portion 8. The main signal processing portion 8 converts the output signal of the multiplier 7 into a video signal of a predetermined format. The main signal processing portion 8 outputs the video signal of the predetermined format.

In the prior-art solid-state imaging apparatus of FIG. 1, the mean luminance detector 4, the microcomputer 5, and the multiplier (the amplifier) 7 cooperate to implement flicker correction or flicker suppression by field-by-filed signal processing. The field-by-field signal processing tends to cause insufficient correction or insufficient suppression of a flicker which occurs in only a portion of a 1-field area.

First Embodiment

Figure 2:
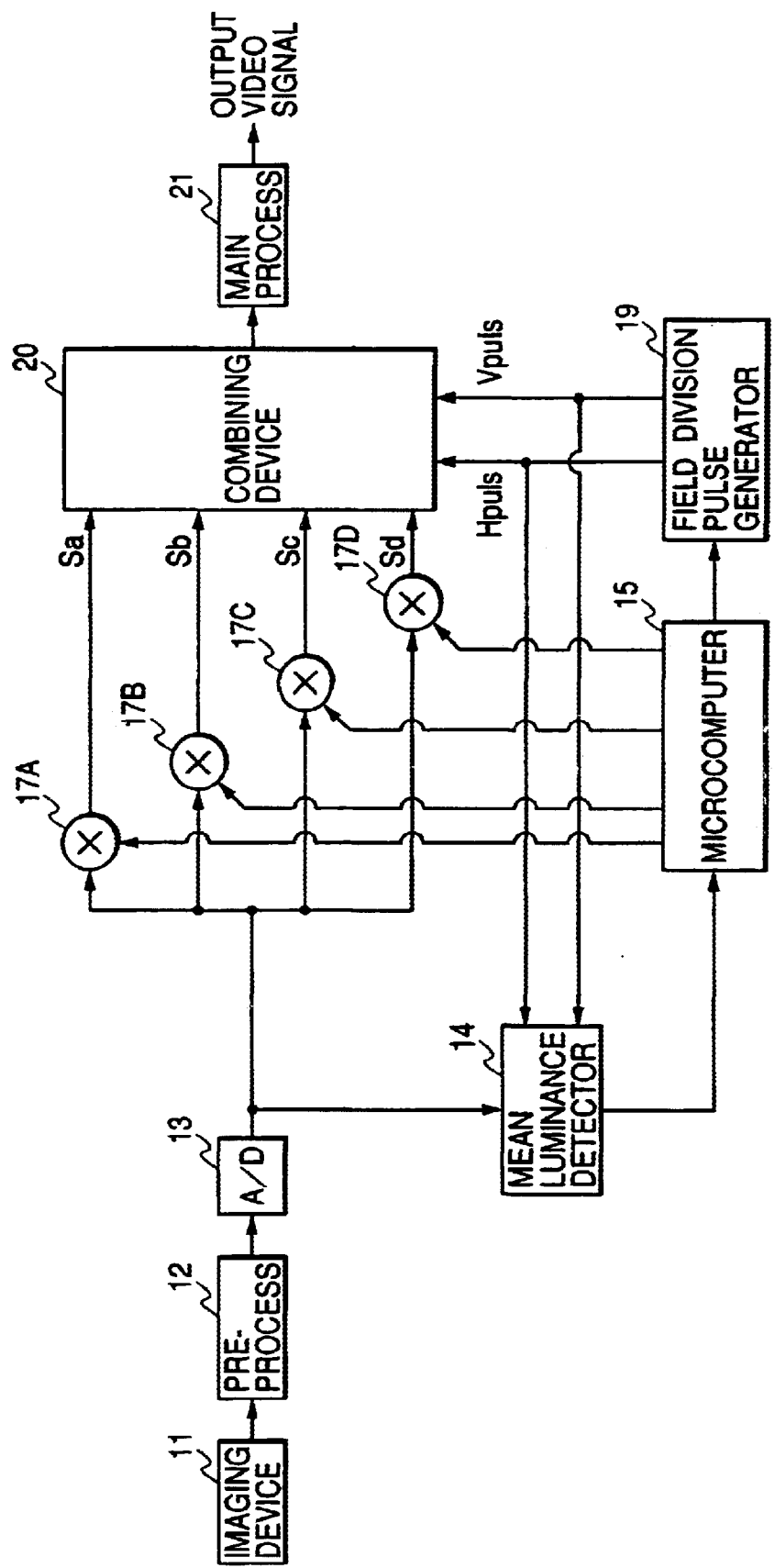
FIG. 2 is a block diagram of a solid-state imaging apparatus according to a first embodiment of this invention.

FIG. 2 shows a solid-state imaging apparatus according to a first embodiment of this invention. The solid-state imaging apparatus of FIG. 2 includes a CCD-based imaging device 11. The imaging device 11 outputs an analog video signal to a pre-processing portion 12. The pre-processing portion 12 subjects the analog video signal to pre-processes such as CDS and AGC. The pre-processing portion 12 outputs the resultant analog video signal to an A/D converter 13. The A/D converter 13 changes the output signal of the pre-processing portion 12 into a corresponding digital video signal in response to a sample clock signal. The A/D converter 13 outputs the digital video signal to a mean luminance detector 14 and multipliers 17A, 17B, 17C, and 17D. The digital video signal outputted from the A/D converter 13 has a sequence of digital samples. The devices 17A, 17B, 17C, and 17D multiply the digital video signal by variable gain factors respectively. In an analog view, the multipliers 17A, 17B, 17C, and 17D act as amplifiers having variable gains.

In the solid-state imaging apparatus of FIG. 2, every field represented by the digital video signal outputted from the A/D converter 13 is divided into four areas (first, second, third, and fourth divided areas) as will be made clear later. The mean luminance detector 14 calculates mean luminances (mean brightnesses) of the respective four divided areas of every field represented by the digital video signal outputted from the A/D converter 13. The mean luminance detector 14 informs a microcomputer 15 of the calculated mean luminances of the respective four divided areas of every field.

The microcomputer 15 includes a combination of an input/output port, a CPU, a ROM, and a RAM. The microcomputer 15 operates in accordance with a program stored in the ROM. The program is designed to implement processes mentioned later.

The RAM within the microcomputer 15 is loaded with data pieces Hstart and Vstart deciding positions of the four divided areas of every field. The microcomputer 15 may analyze images represented by the output signal of the A/D converter 13, and generate the divided-area position data pieces Hstart and Vstart in response to the results of the analysis. Alternatively, the divided-area position data pieces Hstart and Vstart may be transmitted to the microcomputer 15 from an external device. The microcomputer 15 feeds the divided-area position data pieces Hstart and Vstart to a field-division pulse generator 19.

It should be noted that in the microcomputer 15, the ROM rather than the RAM may be loaded with fixed data pieces Hstart and Vstart deciding positions of the four divided areas of every field.

The microcomputer 15 determines desired gain factors for the four divided areas on the basis of the calculated mean luminances of the four divided areas of every field, respectively. The desired gain factors are chosen to suppress or correct flickers in the four divided areas over plural fields represented by the digital video signal outputted from the A/D converter 13. The microcomputer 15 sets the desired gain factors in the multipliers (the amplifiers) 17A, 17B, 17C, and 17D, respectively.

The multipliers (the amplifiers) 17A, 17B, 17C, and 17D are assigned to the four divided areas of every field, respectively. The device 17A multiplies the output signal of the A/D converter 13 by the related desired gain factor, suppressing or correcting a flicker in a first divided area among the four divided areas over plural fields represented by the output signal of the A/D converter 13. The multiplier 17A outputs a resultant digital video signal Sa to an area combining device 20. The device 17B multiplies the output signal of the A/D converter 13 by the related desired gain factor, suppressing or correcting a flicker in a second divided area among the four divided areas over plural fields represented by the output signal of the A/D converter 13. The multiplier 17B outputs a resultant digital video signal Sb to the area combining device 20. The device 17C multiplies the output signal of the A/D converter 13 by the related desired gain factor, suppressing or correcting a flicker in a third divided area among the four divided areas over plural fields represented by the output signal of the A/D converter 13. The multiplier 17C outputs a resultant digital video signal Sc to the area combining device 20. The device 17D multiplies the output signal of the A/D converter 13 by the related desired gain factor, suppressing or correcting a flicker in a fourth divided area among the four divided areas over plural fields represented by the output signal of the A/D converter 13. The multiplier 17D outputs a resultant digital video signal Sd to the area combining device 20.

The field-division pulse generator 19 produces a horizontal field-division pulse signal Hpuls and a vertical field-division pulse signal Vpuls in response to the divided-area position data pieces Hstart and Vstart. The set of the horizontal field-division pulse signal Hpuls and the vertical field-division pulse signal Vpuls represents the positions of the four divided areas of every field. The field-division pulse generator 19 outputs the horizontal field-division pulse signal Hpuls and the vertical field-division pulse signal Vpuls to the mean luminance detector 14 and the area combining device 20. The mean luminance detector 14 derives information of the four divided areas of every field from the set of the horizontal field-division pulse signal Hpuls and the vertical field-division pulse signal Vpuls.

Basically, the area combining device 20 selects one from among the output signals Sa, Sb, Sc, and Sd of the multipliers 17A, 17B, 17C, and 17D in response to the horizontal field-division pulse signal Hpuls and the vertical field-division pulse signal Vpuls. Specifically, the area combining device 20 selects the output signal Sa of the multiplier 17A when the current state of the set of the horizontal field-division pulse signal Hpuls and the vertical field-division pulse signal Vpuls corresponds to the first divided area among the four divided areas. The area combining device 20 selects the output signal Sb of the multiplier 17B when the current state of the set of the horizontal field-division pulse signal Hpuls and the vertical field-division pulse signal Vpuls corresponds to the second divided area among the four divided areas. The area combining device 20 selects the output signal Sc of the multiplier 17C when the current state of the set of the horizontal field-division pulse signal Hpuls and the vertical field-division pulse signal Vpuls corresponds to the third divided area among the four divided areas. The area combining device 20 selects the output signal Sd of the multiplier 17D when the current state of the set of the horizontal field-division pulse signal Hpuls and the vertical field-division pulse signal Vpuls corresponds to the fourth divided area among the four divided areas. The area combining device 20 outputs the selected signal Sout to a main signal processing portion 21.

The main signal processing portion 21 converts the output signal Sout of the area combining device 20 into a video signal of a predetermined format. The main signal processing portion 21 outputs the video signal of the predetermined format.

The divided-area position data piece Hstart represents the horizontal position of a vertically-extending boundary between the four divided areas of every field. The divided-area position data piece Vstart represents the vertical position of a horizontally-extending boundary between the four divided areas of every field. Preferably, the vertically-extending boundary and the horizontally-extending boundary represented by the divided-area position data pieces Hstart and Vstart are movable. Alternatively, the vertically-extending boundary and the horizontally-extending boundary may be fixed.

Figure 3:
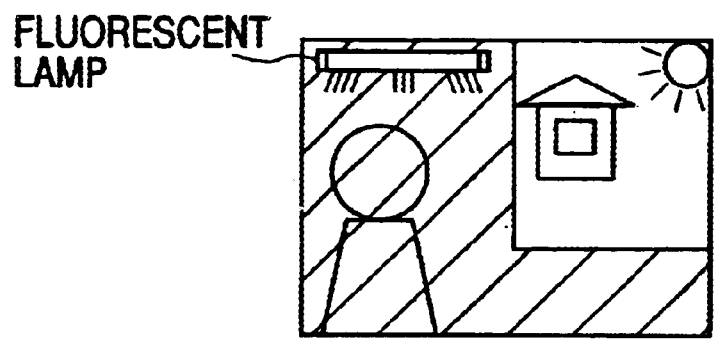
FIG. 3 is a diagram of an example of an image represented by a video signal.
Figure 4:
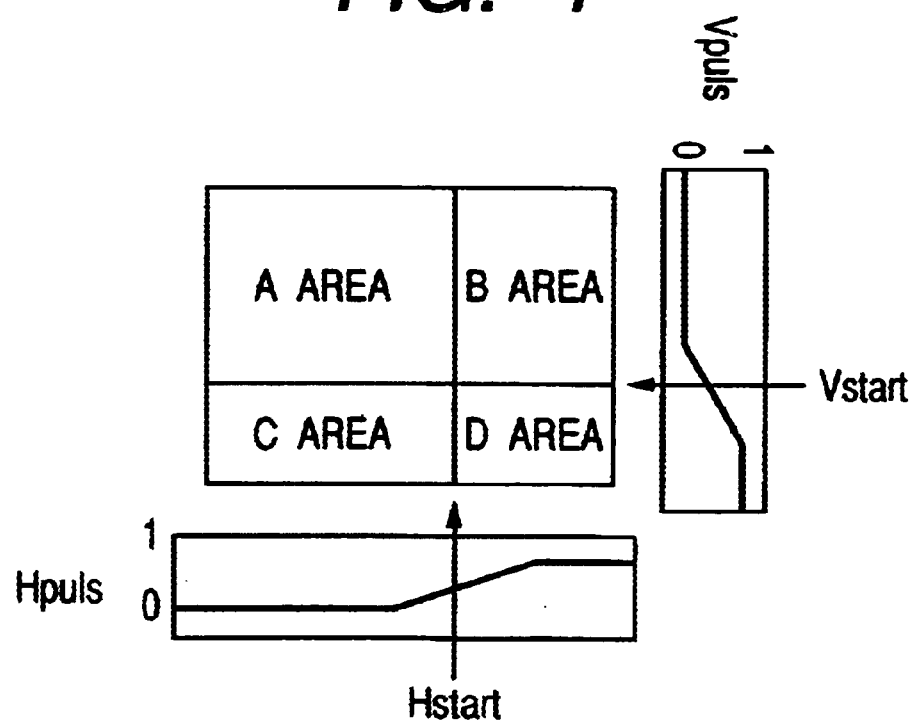
FIG. 4 is a diagram of divided areas in a field, and states of a horizontal field-division pulse signal and a vertical field-division pulse signal.

In the case where the output signal of the A/D converter 13 continues to represent an image in FIG. 3 for a given time interval or longer, the divided-area position data pieces Hstart and Vstart are preferably set to represent a vertically-extending boundary and a horizontally-extending boundary as shown in FIG. 4.

The "A" divided area, the "B" divided area, the "C" divided area, and the "D" divided area of a field in FIG. 4 agree with the first divided area, the second divided area, the third divided area, and the fourth divided area of every field, respectively. Accordingly, the multipliers 17A, 17B, 17C, and 17D are assigned to the "A" divided area, the "B" divided area, the "C" divided area, and the "D" divided area in FIG. 4, respectively.

In NTSC, a field period which equals the reciprocal of a field frequency is 1/60 sec, that is, 16.6 ms. Light generated by a fluorescent lamp powered by 50-Hz AC power iteratively goes on and off at a period of 10 ms. In some cases, an object whose image is taken by an NTSC television camera is illuminated with a fluorescent lamp powered by 50-Hz AC power. In these cases, pictures represented by the output video signal of the television camera flicker at a period of 50 ms (a 3-field-corresponding period) which equals the least common multiple of 16.6 ms and 10 ms.

The microcomputer 15 determines desired gain factors for the respective divided areas (the "A" divided area, the "B" divided area, the "C" divided area, and the "D" divided area) of every field in view of the above-mentioned flicker conditions. Specifically, for each of the divided areas of every field, the microcomputer 15 sums or adds the calculated mean luminances of the present divided area in the last three fields. The microcomputer 15 divides the addition result by three to calculate a second mean luminance of the present divided area over the last three fields. The microcomputer 15 calculates the difference between the current calculated mean luminance of the present divided area and the second mean luminance thereof. The microcomputer 15 determines a desired gain factor for the present divided area in response to the calculated difference. The desired gain factor is chosen to decrease the difference.

As shown in FIG. 4, the horizontal field-division pulse signal Hpuls has a value of 0 in a portion of every field which extends leftward of the horizontal position represented by the divided-area position data piece Hstart. The horizontal field-division pulse signal Hpuls has a value of 1 in a portion of every field which extends rightward of the horizontal position represented by the divided-area position data piece Hstart. At and around the horizontal position represented by the divided-area position data piece Hstart, the value of the horizontal field-division pulse signal Hpuls linearly increases from 0 to 1 in the rightward direction.

As shown in FIG. 4, the vertical field-division pulse signal Vpuls has a value of 0 in a portion of every field which extends above the vertical position represented by the divided-area position data piece Vstart. The vertical field-division pulse signal Vpuls has a value of 1 in a portion of every field which extends below the vertical position represented by the divided-area position data piece Vstart. At and around the vertical position represented by the divided-area position data piece Vstart, the value of the vertical field-division pulse signal Vpuls linearly increases from 0 to 1 in the downward direction.

The area combining device 20 combines the output signals Sa, Sb, Sc, and Sd of the multipliers 17A, 17B, 17C, and 17D into the combination-result signal Sout in response to the horizontal field-division pulse signal Hpuls and the vertical field-division pulse signal Vpuls according to the following equation.

$$Sout = Vpuls \cdot \{Hpuls \cdot (Sa-Sb) - Hpuls \cdot (Sc-Sd) + (Sc-Sa)\} - Hpuls \cdot (Sa-Sb) + Sa \quad (1)$$

Figure 5:
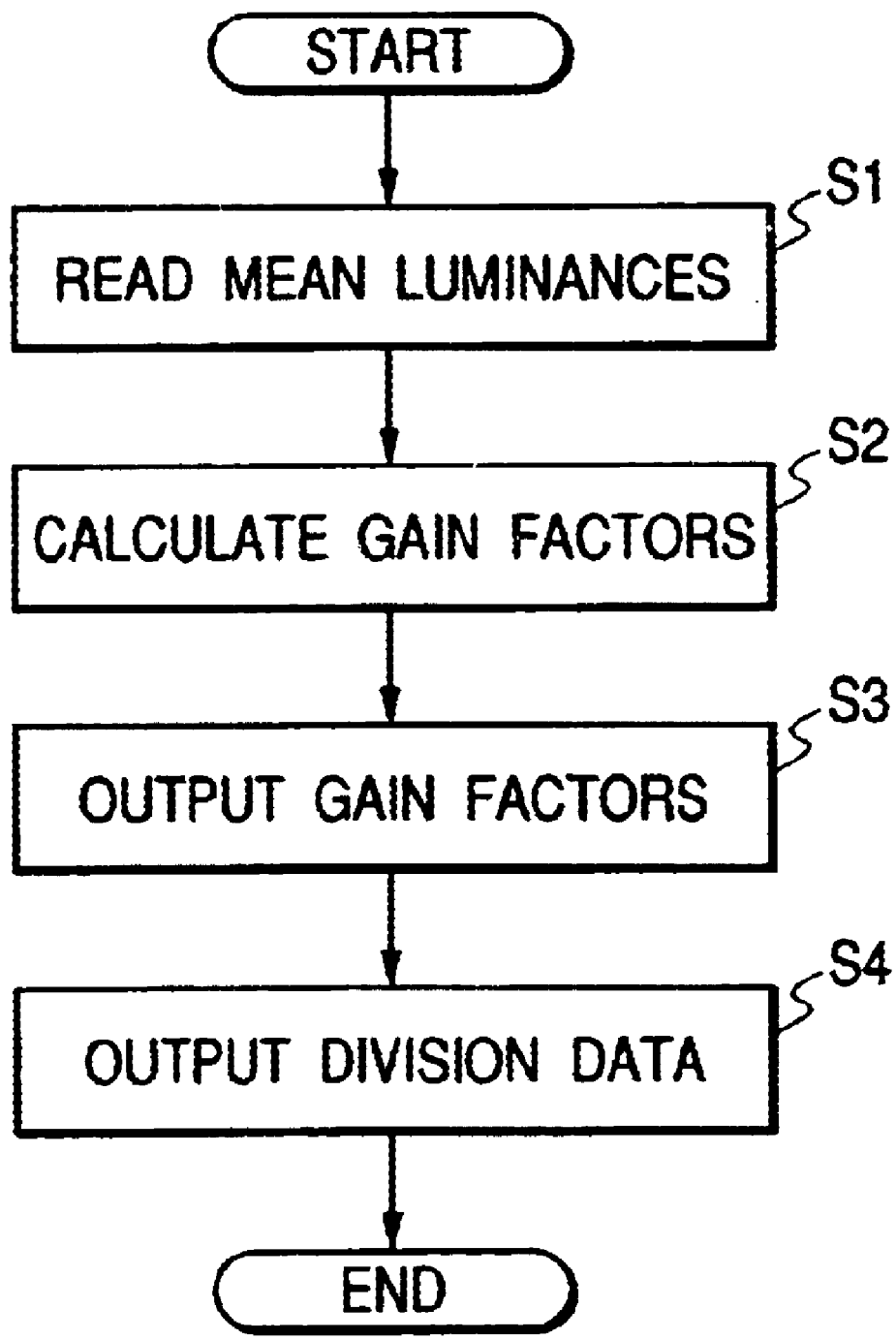
FIG. 5 is a flowchart of a segment of a program for controlling a microcomputer in FIG. 2.

As previously mentioned, the microcomputer 15 operates in accordance with a program stored in the internal ROM. FIG. 5 is a flowchart of a segment of the program which is executed for every field.

As shown in FIG. 5, a first block S1 of the program segment reads out information of the calculated mean luminances of the respective four divided areas of the last field from the mean luminance detector 14.

A block S2 following the block S1 determines or calculates desired gain factors for the respective four divided areas. Specifically, for each of the four divided areas, the block S2 adds the calculated mean luminances of the present divided area in the last three fields. The block S2 divides the addition result by three to calculate a second mean luminance of the present divided area over the last three fields. The block S2 calculates the difference between the current calculated mean luminance of the present divided area and the second mean luminance thereof. The block S2 determines a desired gain factor for the present divided area in response to the calculated difference according to a predetermined function or a predetermined table. The desired gain factor is chosen to decrease the difference.

A block S3 subsequent to the block S2 outputs signals of the calculated desired gain factors to the multipliers 17A, 17B, 17C, and 17D, respectively. Thus, the signals of the calculated desired gain factors are set in the multipliers 17A, 17B, 17C, and 17D, respectively.

A block S4 following the block S3 outputs the divided-area position data pieces Hstart and Vstart to the field-division pulse generator 19. After the block S4, the current execution cycle of the program segment ends.

Figure 6:
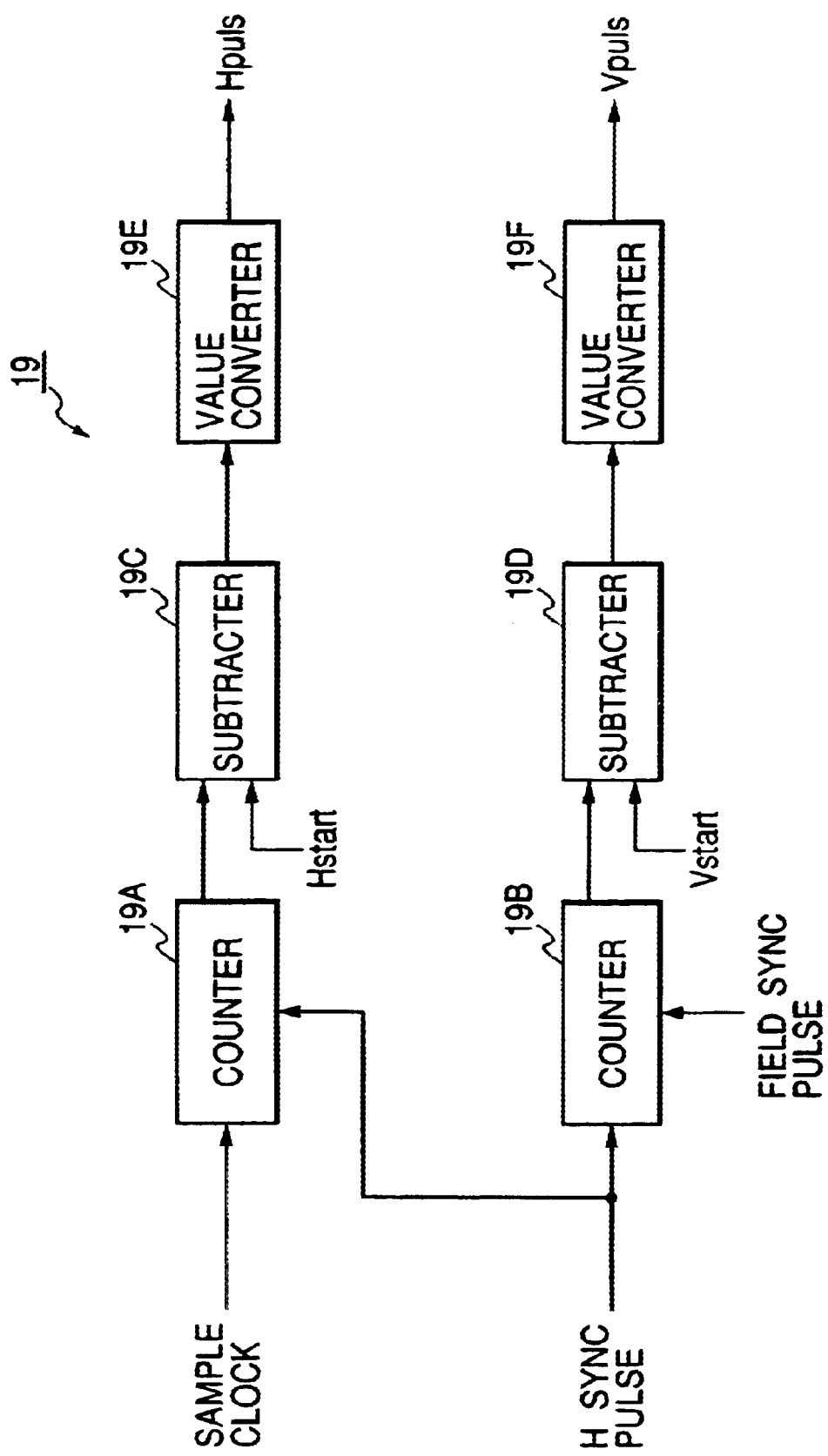
FIG. 6 is a block diagram of a field-division pulse generator in FIG. 2.

As shown in FIG. 6, the field-division pulse generator 19 includes counters 19A and 19B, subtracters 19C and 19D, and value converters 19E and 19F.

The device 19A counts pulses of the sample clock signal. The counter 19A is reset by every pulse of a horizontal sync pulse signal. The counter 19A outputs a count-result signal to the subtracter 19C. The subtracter 19C receives the divided-area position data piece Hstart. The device 19C subtracts the value represented by the divided-area position data piece Hstart from the value represented by the output signal of the counter 19A. The device 19C outputs a subtraction-result signal to the value converter 19E. The value converter 19E changes the subtraction-result signal into the horizontal field-division pulse signal Hpuls. The value converter 19E includes a ROM storing a table which provides the following value converting function. When the value represented by the subtraction-result signal is smaller than a predetermined negative limit value, the horizontal field-division pulse signal Hpuls has a value of 0. When the value represented by the subtraction-result signal is greater than a predetermined positive limit value, the horizontal field-division pulse signal Hpuls has a value of 1. As the value represented by the subtraction-result signal increases from the predetermined negative limit value to the predetermined positive limit value, the value of the horizontal field-division pulse signal Hpuls linearly increases from 0 to 1. When the value represented by the subtraction-result signal is equal to 0, the value of the horizontal field-division pulse signal Hpuls is equal to 0.5.

The device 19B counts pulses of the horizontal sync pulse signal. The counter 19B is reset by every pulse of a field sync pulse signal. The counter 19B outputs a count-result signal to the subtracter 19D. The subtracter 19D receives the divided-area position data piece Vstart. The device 19D subtracts the value represented by the divided-area position data piece Vstart from the value represented by the output signal of the counter 19B. The device 19D outputs a subtraction-result signal to the value converter 19F. The value converter 19F changes the subtraction-result signal into the vertical field-division pulse signal Vpuls. The value converter 19F includes a ROM storing a table which provides the following value converting function. When the value represented by the subtraction-result signal is smaller than a predetermined negative limit value, the vertical field-division pulse signal Vpuls has a value of 0. When the value represented by the subtraction-result signal is greater than a predetermined positive limit value, the horizontal field-division pulse signal Vpuls has a value of 1. As the value represented by the subtraction-result signal increases from the predetermined negative limit value to the predetermined positive limit value, the value of the vertical field-division pulse signal Vpuls linearly increases from 0 to 1. When the value represented by the subtraction-result signal is equal to 0, the value of the vertical field-division pulse signal Vpuls is equal to 0.5.

Figure 7:
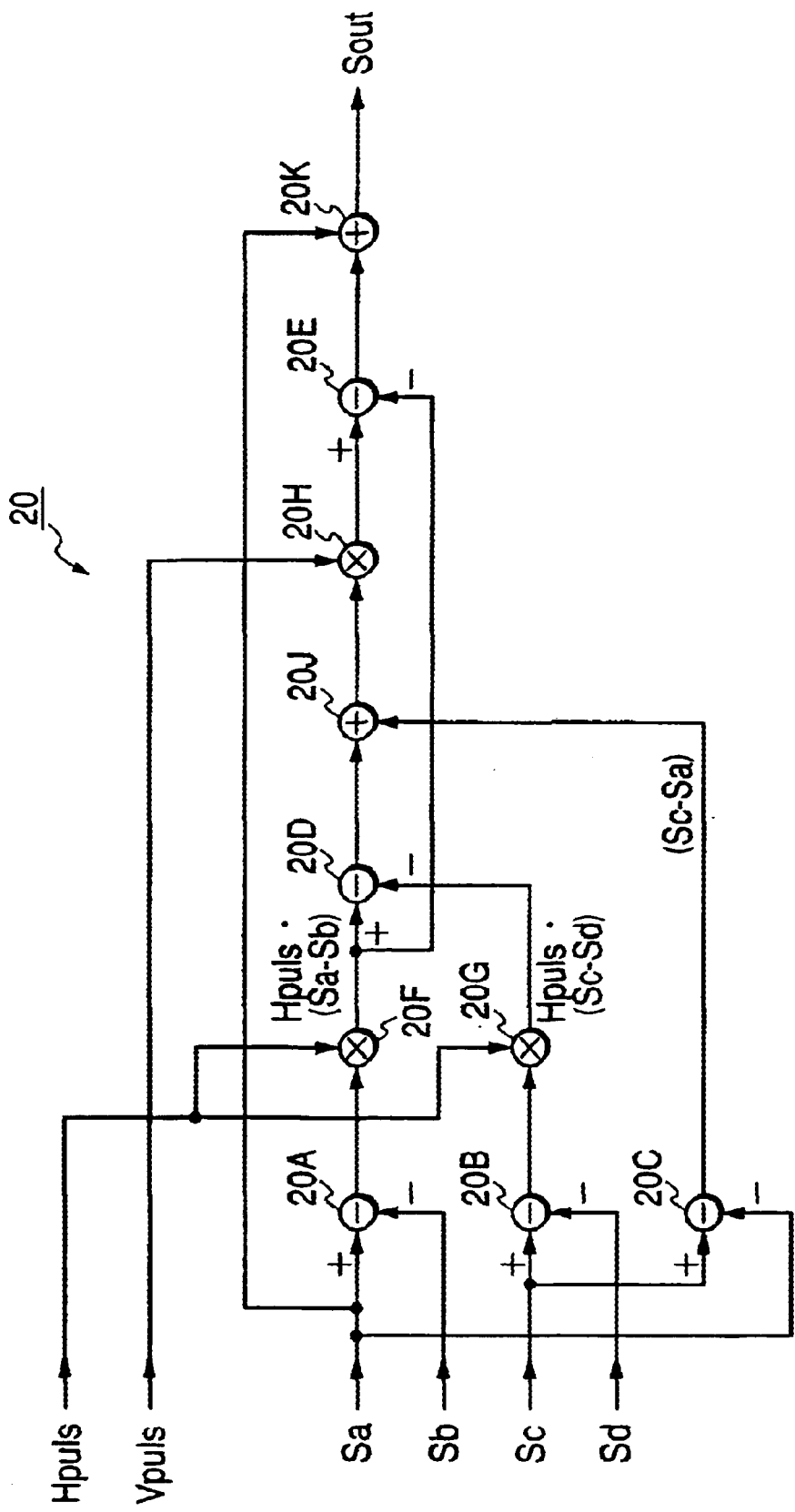
FIG. 7 is a block diagram of an area combining device in FIG. 2.

As shown in FIG. 7, the area combining device 20 includes subtracters 20A, 20B, 20C, 20D, and 20E, multipliers 20F, 20G, and 20H, and adders 20J and 20K.

The subtracter 20A receives the output signals Sa and Sb of the multipliers 17A and 17B. The device 20A subtracts the signal Sb from the signal Sa, thereby generating a signal "Sa−Sb". The subtracter 20A outputs the signal "Sa−Sb" to the multiplier 20F. The multiplier 20F receives the horizontal field-division pulse signal Hpuls. The device 20F multiplies the signal Hpuls and the signal "Sa−Sb", thereby generating a signal "Hpuls·(Sa−Sb)". The multiplier 20F outputs the signal "Hpuls·(Sa−Sb)" to the subtracters 20D and 20E.

The subtracter 20B receives the output signals Sc and Sd of the multipliers 17C and 17D. The device 20B subtracts the signal Sd from the signal Sc, thereby generating a signal "Sc−Sd". The subtracter 20B outputs the signal "Sc−Sd" to the multiplier 20G. The multiplier 20G receives the horizontal field-division pulse signal Hpuls. The device 20G multiplies the signal Hpuls and the signal "Sc–Sd", thereby generating a signal "Hpuls·(Sc–Sd)". The multiplier 20G outputs the signal "Hpuls·(Sc–Sd)" to the subtracter 20D.

The subtracter 20C receives the output signals Sa and Sc of the multipliers 17A and 17C. The device 20C subtracts the signal Sa from the signal Sc, thereby generating a signal "Sc–Sa". The subtracter 20C outputs the signal "Sc–Sa" to the adder 20J.

The device 20D subtracts the signal "Hpuls·(Sc–Sd)" from the signal "Hpuls·(Sa–Sb)", thereby generating a signal "Hpuls·(Sa–Sb)–Hpuls·(Sc–Sd)". The subtracter 20D outputs the signal "Hpuls·(Sa–Sb)–Hpuls·(Sc–Sd)" to the adder 20J. The device 20J adds the signal "Sc–Sa" and the signal "Hpuls·(Sa–Sb)–Hpuls·(Sc–Sd)", thereby generating a signal "Hpuls·(Sa–Sb)–Hpuls·(Sc–Sd)+(Sc–Sa)". The adder 20J outputs the signal "Hpuls·(Sa–Sb)–Hpuls·(Sc–Sd)+(Sc–Sa)" to the multiplier 20H.

The multiplier 20H receives the vertical field-division pulse signal Vpuls. The device 20H multiplies the signal Vpuls and the signal "Hpuls·(Sa–Sb)–Hpuls·(Sc–Sd)+(Sc–Sa)", thereby generating a signal "Vpuls{Hpuls·(Sa–Sb)–Hpuls·(Sc–Sd)+(Sc–Sa)}". The multiplier 20H outputs the signal "Vpuls{Hpuls·(Sa–Sb)–Hpuls·(Sc–Sd)+(Sc–Sa)}" to the subtracter 20E.

The device 20E subtracts the signal "Hpuls·(Sa–Sb)" from the signal "Vpuls{Hpuls·(Sa–Sb)–Hpuls·(Sc–Sd)+(Sc–Sa)}", thereby generating a signal "Vpuls{Hpuls·(Sa–Sb)–Hpuls·(Sc–Sd)+(Sc–Sa)}–Hpuls·(Sa–Sb)". The subtracter 20E outputs the signal "Vpuls{Hpuls·(Sa–Sb)–Hpuls·(Sc–Sd)+(Sc–Sa)}–Hpuls·(Sa·Sb)" to the adder 20K.

The adder 20K receives the output signal Sa of the multiplier 17A. The device 20K adds the signal "Vpuls{Hpuls·(Sa–Sb)–Hpuls·(Sc–Sd)+(Sc–Sa)}–Hpuls·(Sa–Sb)" and the signal Sa, thereby generating the combination-result signal Sout which is expressed by the previously-indicated equation (1). The adder 20K outputs the combination-result signal Sout to the main signal processing portion 21.

Figure 8:
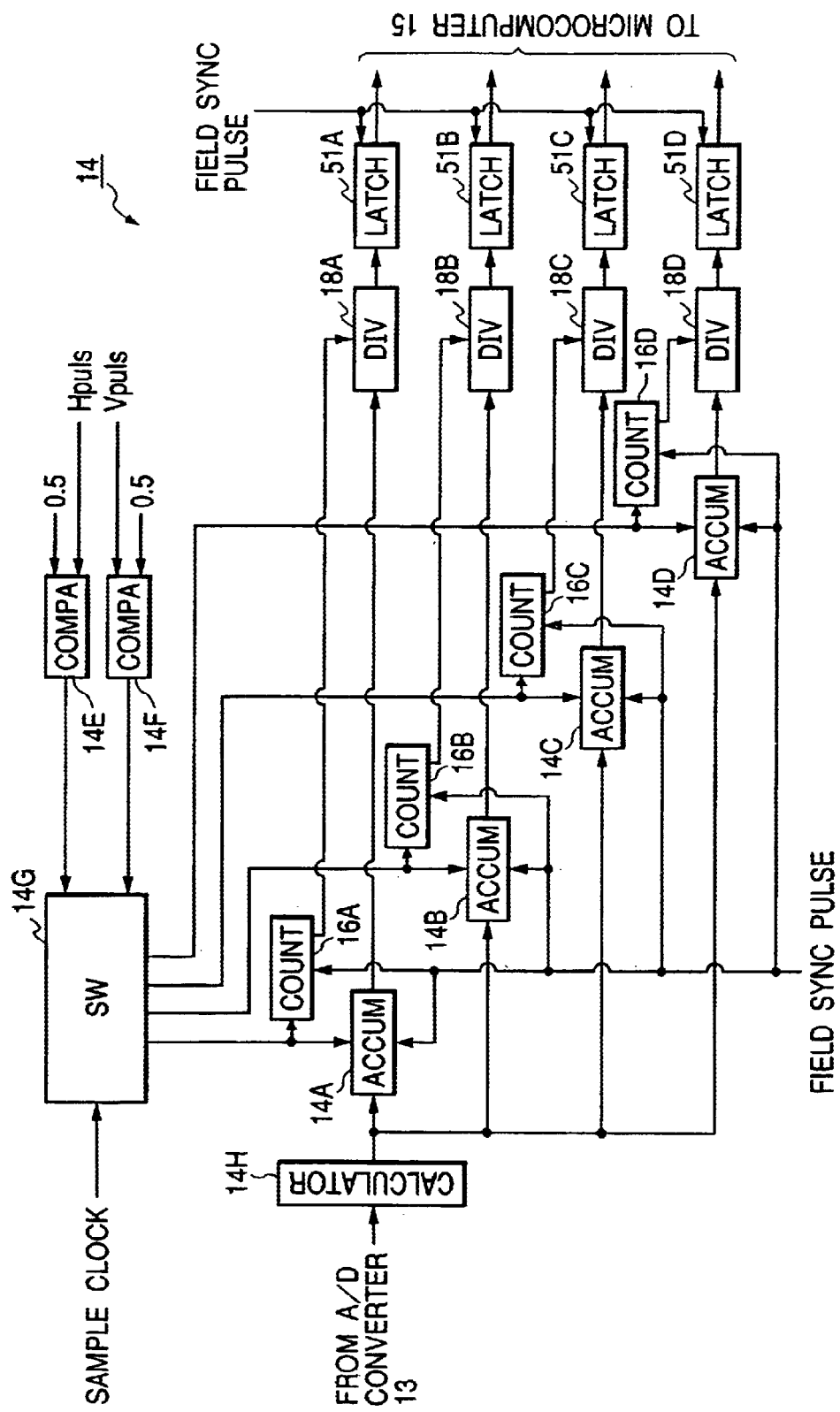
FIG. 8 is a block diagram of a mean luminance detector in FIG. 2.

As shown in FIG. 8, the mean luminance detector 14 includes accumulators 14A, 14B, 14C, 14D, comparators 14E and 14F, a switch 14G, a calculator 14H, counters 16A, 16B, 16C, and 16D, dividers 18A, 18B, 18C, and 18D, and latches 51A, 51B, 51C, and 51D.

The comparator 14E receives the horizontal field-division pulse signal Hpuls. A fixed signal having a value of 0.5 is fed to the comparator 14E. The device 14E compares the horizontal field-division pulse signal Hpuls and the fixed signal, thereby binarizing the horizontal field-division pulse signal Hpuls into a horizontal position signal Hp. The comparator 14E outputs the horizontal position signal Hp to the switch 14G.

The comparator 14F receives the vertical field-division pulse signal Vpuls. A fixed signal having a value of 0.5 is fed to the comparator 14F. The device 14F compares the vertical field-division pulse signal Vpuls and the fixed signal, thereby binarizing the vertical field-division pulse signal Vpuls into a vertical position signal Vp. The comparator 14F outputs the vertical position signal Vp to the switch 14G.

The set of the horizontal position signal Hp and the vertical position signal Vp being "0" and "0" corresponds to the first divided area (the "A" divided area) in every field. The set of the horizontal position signal Hp and the vertical position signal Vp being "1" and "0" corresponds to the second divided area (the "B" divided area) in every field. The set of the horizontal position signal Hp and the vertical position signal Vp being "0" and "1" corresponds to the third divided area (the "C" divided area) in every field. The set of the horizontal position signal Hp and the vertical position signal Vp being "1" and "1" corresponds to the fourth divided area (the "D" divided area) in every field.

The calculator 14H receives the digital video signal from the A/D converter 13. The device 14H calculates the luminance indicated by every sample of the digital video signal, and generates a signal (a sample luminance signal) representative thereof. The calculator 14H outputs the sample luminance signal to the accumulators 14A, 14B, 14C, and 14D.

The accumulator 14A, the counter 16A, the divider 18A, and the latch 51A are assigned to the first divided area (the "A" divided area) in every field. The accumulator 14B, the counter 16B, the divider 18B, and the latch 51B are assigned to the second divided area (the "B" divided area) in every field. The accumulator 14C, the counter 16C, the divider 18C, and the latch 51C are assigned to the third divided area (the "C" divided area) in every field. The accumulator 14D, the counter 16D, the divider 18D, and the latch 51D are assigned to the fourth divided area (the "D" divided area) in every field.

The switch 14G receives the sample clock signal. The switch 14G transmits every pulse of the sample clock signal to one of the accumulators 14A, 14B, 14C, and 14D and one of the counters 16A, 16B, 16C, and 16D as an enabling pulse in response to the set of the horizontal position signal Hp and the vertical position signal Vp. Specifically, the switch 14G outputs an enabling pulse to the accumulator 14A and the counter 16A when the current state of the set of the horizontal position signal Hp and the vertical position signal Vp corresponds to the first divided area (the "A" divided area). The switch 14G outputs an enabling pulse to the accumulator 14B and the counter 16B when the current state of the set of the horizontal position signal Hp and the vertical position signal Vp corresponds to the second divided area (the "B" divided area). The switch 14G outputs an enabling pulse to the accumulator 14C and the counter 16C when the current state of the set of the horizontal position signal Hp and the vertical position signal Vp corresponds to the third divided area (the "C" divided area). The switch 14G outputs an enabling pulse to the accumulator 14D and the counter 16D when the current state of the set of the horizontal position signal Hp and the vertical position signal Vp corresponds to the fourth divided area (the "D" divided area).

Each of the accumulators 14A, 14B, 14C, and 14D adds the stored value and the current sample luminance, and stores the addition result as a new stored value in response to every enabling pulse. Each of the accumulators 14A, 14B, 14C, and 14D continues to hold the stored value when not receiving any enabling pulse. The accumulators 14A, 14B, 14C, and 14D are reset by every pulse of the field sync pulse signal. The accumulator 14A outputs a signal of the stored value to the divider 18A. The accumulator 14B outputs a signal of the stored value to the divider 18B. The accumulator 14C outputs a signal of the stored value to the divider 18C. The accumulator 14D outputs a signal of the stored value to the divider 18D.

Each of the counters 16A, 16B, 16C, and 16D counts applied enabling pulses. The counter 16A outputs a signal of the counted pulse number to the divider 18A. The counter 16B outputs a signal of the counted pulse number to the divider 18B. The counter 16C outputs a signal of the counted pulse number to the divider 18C. The counter 16D outputs a signal of the counted pulse number to the divider 18D. The counters 16A, 16B, 16C, and 16D are reset by every pulse of the field sync pulse signal.

The device 18A divides the value of the output signal of the accumulator 14A by the value of the output signal of the counter 16A. The divider 18A outputs a division-result signal to the latch 51A. At an end of every field, the value of the output signal of the accumulator 14A is equal to the sum of the luminances indicated by the samples in the first divided area (the "A" divided area), and the value of the output signal of the counter 16A is equal to the total number of the samples in the first divided area (the "A" divided area). Thus, at an end of every field, the output signal of the divider 18A represents the mean luminance of the first divided area (the "A" divided area).

The device 18B divides the value of the output signal of the accumulator 14B by the value of the output signal of the counter 16B. The divider 18B outputs a division-result signal to the latch 51B. At an end of every field, the value of the output signal of the accumulator 14B is equal to the sum of the luminances indicated by the samples in the second divided area (the "B" divided area), and the value of the output signal of the counter 16B is equal to the total number of the samples in the second divided area (the "B" divided area). Thus, at an end of every field, the output signal of the divider 18B represents the mean luminance of the second divided area (the "B" divided area).

The device 18C divides the value of the output signal of the accumulator 14C by the value of the output signal of the counter 16C. The divider 18C outputs a division-result signal to the latch 51C. At an end of every field, the value of the output signal of the accumulator 14C is equal to the sum of the luminances indicated by the samples in the third divided area (the "C" divided area), and the value of the output signal of the counter 16C is equal to the total number of the samples in the third divided area (the "C" divided area). Thus, at an end of every field, the output signal of the divider 18C represents the mean luminance of the third divided area (the "C" divided area).

The device 18D divides the value of the output signal of the accumulator 14D by the value of the output signal of the counter 16D. The divider 18D outputs a division-result signal to the latch 51D. At an end of every field, the value of the output signal of the accumulator 14D is equal to the sum of the luminances indicated by the samples in the fourth divided area (the "D" divided area), and the value of the output signal of the counter 16D is equal to the total number of the samples in the fourth divided area (the "D" divided area). Thus, at an end of every field, the output signal of the divider 18D represents the mean luminance of the fourth divided area (the "D" divided area).

The latches 51A, 51B, 51C, and 51D receive the field sync pulse signal, and respond to every pulse of the field sync pulse signal. The device 51A latches the output signal of the divider 18A at an end of every field. The device 51A outputs the latched signal to the microcomputer 15 which represents the mean luminance of the first divided area (the "A" divided area). The device 51B latches the output signal of the divider 18B at an end of every field. The device 51B outputs the latched signal to the microcomputer 15 which represents the mean luminance of the second divided area (the "B" divided area). The device 51C latches the output signal of the divider 18C at an end of every field. The device 51C outputs the latched signal to the microcomputer 15 which represents the mean luminance of the third divided area (the "C" divided area). The device 51D latches the output signal of the divider 18D at an end of every field. The device 51D outputs the latched signal to the microcomputer 15 which represents the mean luminance of the fourth divided area (the "D" divided area).

Second Embodiment

A second embodiment of this invention is similar to the first embodiment thereof except for design changes indicated hereinafter. In the second embodiment of this invention, every field represented by the output signal of an A/D converter 13 is divided into two areas, that is, an inner divided area and an outer divided area. In the second embodiment of this invention, a RAM or a ROM within a microcomputer 15 is loaded with data pieces Hstart, Hend, Vstart, and Vend deciding positions of the two divided areas of every field.

The microcomputer 15 feeds the divided-area position data pieces Hstart, Hend, Vstart, and Vend to a field-division pulse generator 19. The field-division pulse generator 19 produces a horizontal field-division pulse signal Hpuls and a vertical field-division pulse signal Vpuls in response to the divided-area position data pieces Hstart, Hend, Vstart, and Vend.

Figure 9:
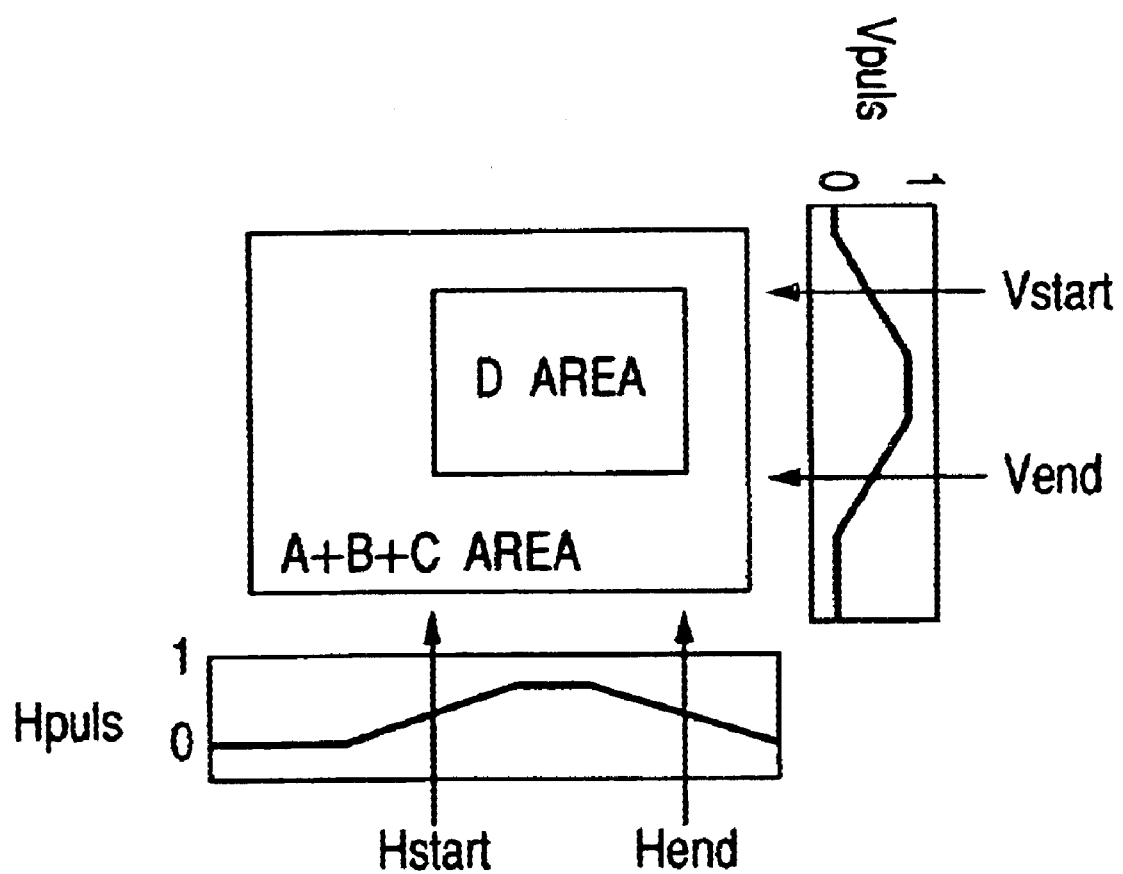
FIG. 9 is a diagram of divided areas in a field, and states of a horizontal field-division pulse signal and a vertical field-division pulse signal according to a second embodiment of this invention.

As shown in FIG. 9, the divided-area position data piece Hstart represents the horizontal position of a vertically-extending left-hand boundary between the inner and outer divided areas of every field. The divided-area position data piece Hend represents the horizontal position of a vertically-extending right-hand boundary between the inner and outer divided areas of every field. The divided-area position data piece Vstart represents the vertical position of a horizontally-extending upper boundary between the inner and outer divided areas of every field. The divided-area position data piece Vend represents the vertical position of a horizontally-extending lower boundary between the inner and outer divided areas of every field.

The inner and outer divided areas have the following relation with an "A" divided area, a "B" divided area, a "C" divided area, and a "D" divided area in the first embodiment of this invention. The inner divided area corresponds to a "D" divided area while the outer divided area corresponds to the sum of an "A" divided area, a "B" divided area, and a "C" divided area.

As shown in FIG. 9, the horizontal field-division pulse signal Hpuls has a value of 0 in a portion of every field which extends leftward of the horizontal position represented by the divided-area position data piece Hstart and also in a portion of every field which extends rightward of the horizontal position represented by the divided-area position data piece Hend. The horizontal field-division pulse signal Hpuls has a value of 1 in a portion of every field which extends between the horizontal position represented by the divided-area position data piece Hstart and the horizontal position represented by the divided-area position data piece Hend. At and around the horizontal position represented by the divided-area position data piece Hstart, the value of the horizontal field-division pulse signal Hpuls linearly increases from 0 to 1 in the rightward direction. At and around the horizontal position represented by the divided-area position data piece Hend, the value of the horizontal field-division pulse signal Hpuls linearly decreases from 1 to 0 in the rightward direction.

As shown in FIG. 9, the vertical field-division pulse signal Vpuls has a value of 0 in a portion of every field which extends above the vertical position represented by the divided-area position data piece Vstart and also in a portion of every field which extends below the vertical position represented by the divided-area position data piece Vend. The vertical field-division pulse signal Vpuls has a value of 1 in a portion of every field which extends between the vertical position represented by the divided-area position data piece Vstart and the vertical position represented by the divided-area position data piece Vend. At and around the vertical position represented by the divided-area position data piece Vstart, the value of the vertical field-division pulse signal Vpuls linearly increases from 0 to 1 in the downward direction. At and around the vertical position represented by the divided-area position data piece Vend, the value of the vertical field-division pulse signal Vpuls linearly decreases from 1 to 0 in the downward direction.

In the second embodiment of this invention, a mean luminance detector 14 calculates mean luminances (mean brightnesses) of the respective two divided areas, that is, the respective inner and outer divided areas, in every field represented by the output signal of the A/D converter 13. Flicker correction on the inner divided area and flicker correction on the outer divided area are implemented in response to the calculated mean luminances of the inner and outer divided areas respectively. Basically, the flicker correction on the inner divided area and the flicker correction on the outer divided are independent of each other.

Third Embodiment

A third embodiment of this invention is similar to the first embodiment or the second embodiment thereof except for design changes mentioned hereinafter.

Figure 10:
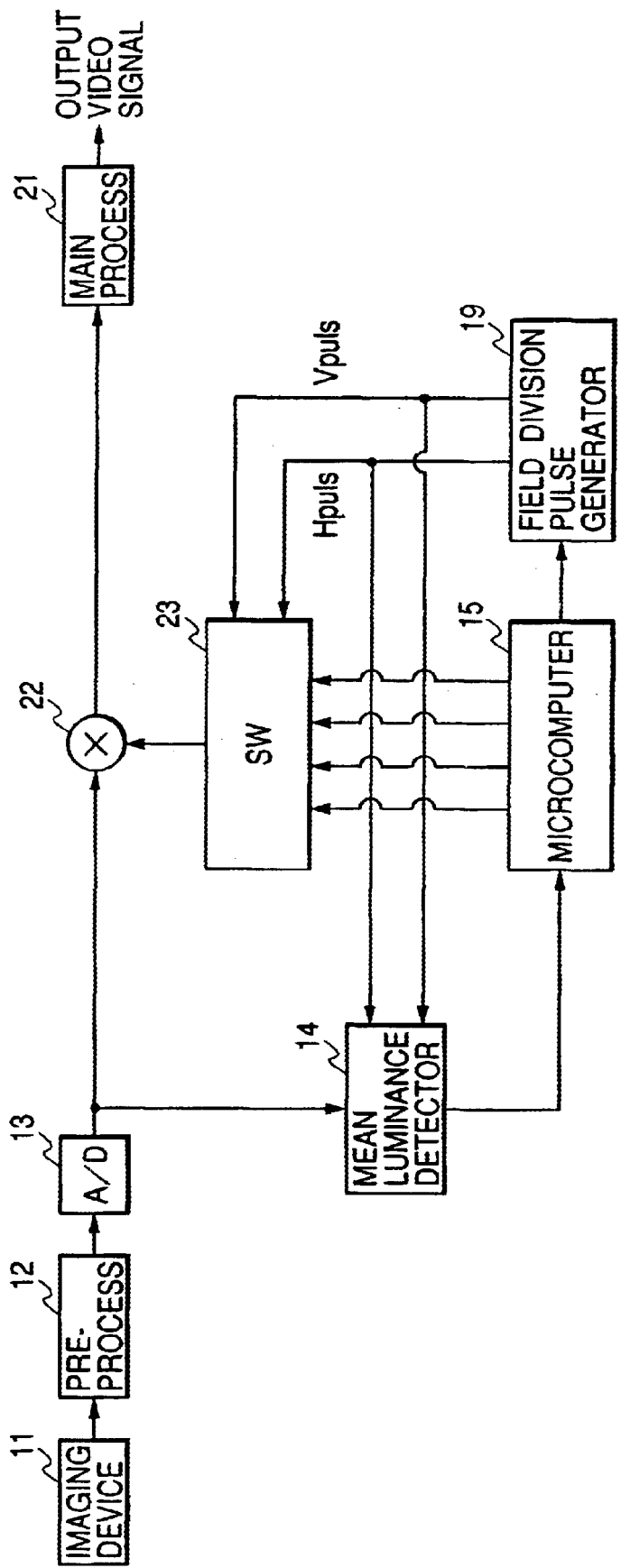
FIG. 10 is a block diagram of a solid-state imaging apparatus according to a third embodiment of this invention.

FIG. 10 shows a solid-state imaging apparatus according to the third embodiment of this invention. The solid-state imaging apparatus of FIG. 10 includes a multiplier 22 and a switch 23 which replace the multipliers 17A, 17B, 17C, and 17D and the area combining device 20 in FIG. 2.

The multiplier 22 receives the digital video signal from the A/D converter 13. The device 22 multiplies the digital video signal by a variable gain factor. In an analog view, the multiplier 22 acts as an amplifier having a variable gain.

The switch 23 receives the set of the horizontal field-division pulse signal Hpuls and the vertical field-division pulse signal Vpuls from the field-division pulse generator 19. The switch 23 receives output signals of the microcomputer 15 which represent desired gain factors for the first, second, third, and fourth divided areas (the "A" divided area, the "B" divided area, the "C" divided area, and the "D" divided area) in every field, respectively. The switch 23 selects one of the desired gain factors in response to the horizontal field-division pulse signal Hpuls and the vertical field-division pulse signal Vpuls. The switch 23 informs the multiplier 22 of the selected desired gain factor.

Specifically, the switch 23 selects the desired gain factor for the first divided area (the "A" divided area) when the current state of the set of the horizontal field-division pulse signal Hpuls and the vertical field-division pulse signal Vpuls corresponds to the first divided area (the "A" divided area). The switch 23 selects the desired gain factor for the second divided area (the "B" divided area) when the current state of the set of the horizontal field-division pulse signal Hpuls and the vertical field-division pulse signal Vpuls corresponds to the second divided area (the "B" divided area). The switch 23 selects the desired gain factor for the third divided area (the "C" divided area) when the current state of the set of the horizontal field-division pulse signal Hpuls and the vertical field-division pulse signal Vpuls corresponds to the third divided area (the "C" divided area). The switch 23 selects the desired gain factor for the fourth divided area (the "D" divided area) when the current state of the set of the horizontal field-division pulse signal Hpuls and the vertical field-division pulse signal Vpuls corresponds to the fourth divided area (the "D" divided area).

The device 22 multiplies the output signal of the A/D converter 13 by the desired gain factor, thereby changing the output signal of the A/D converter 13 into a flicker-correction-resultant digital video signal Sout. The multiplier 22 outputs the digital video signal Sout to the main signal processing portion 21.

Fourth Embodiment

A fourth embodiment of this invention is similar to the first embodiment or the second embodiment thereof except for design changes mentioned hereinafter.

Figure 11:
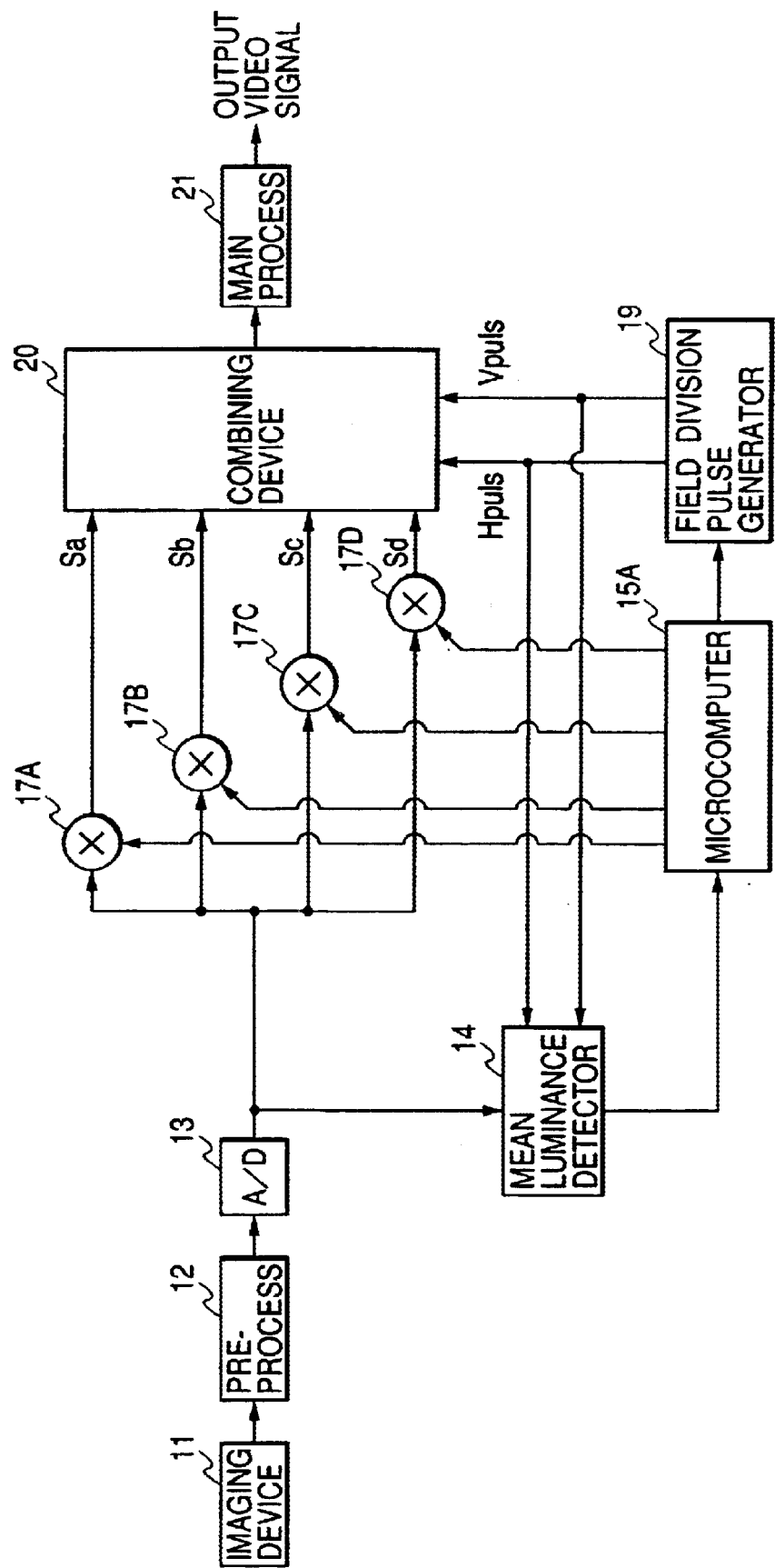
FIG. 11 is a block diagram of a solid-state imaging apparatus according to a fourth embodiment of this invention.

FIG. 11 shows a solid-state imaging apparatus according to the fourth embodiment of this invention. The solid-state imaging apparatus of FIG. 11 includes a microcomputer 15A instead of the microcomputer 15 in FIG. 2.

Figure 12:
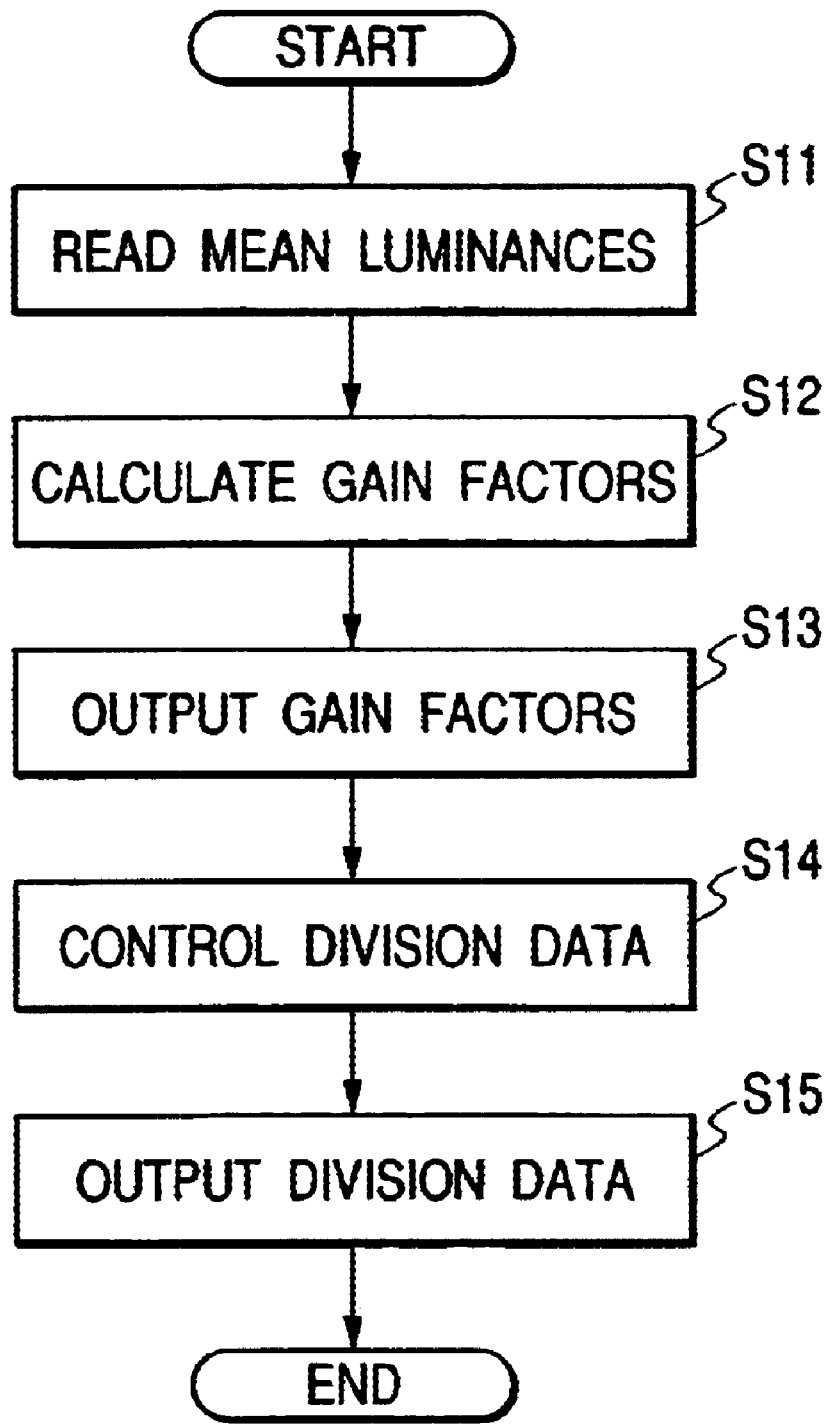
FIG. 12 is a flowchart of a segment of a program for controlling a microcomputer in FIG. 11.

The microcomputer 15A operates in accordance with a program stored in an internal ROM. FIG. 12 is a flowchart of a segment of the program which is executed for every field.

As shown in FIG. 12, a first block S11 of the program segment reads out information of the calculated mean luminances of the respective four divided areas of the last field from the mean luminance detector 14.

A block S12 following the block S11 determines or calculates desired gain factors for the respective four divided areas. Specifically, for each of the four divided areas, the block S12 adds the calculated mean luminances of the present divided area in the last three fields. The block S12 divides the addition result by three to calculate a second mean luminance of the present divided area over the last three fields. The block S12 calculates the difference between the current calculated mean luminance of the present divided area and the second mean luminance thereof. The block S12 determines a desired gain factor for the present divided area in response to the calculated difference according to a predetermined function or a predetermined table. The desired gain factor is chosen to decrease the difference.

A block S13 subsequent to the block S12 outputs signals of the calculated desired gain factors to the multipliers 17A, 17B, 17C, and 17D, respectively. Thus, the signals of the calculated desired gain factors are set in the multipliers 17A, 17B, 17C, and 17D, respectively.

A block S14 following the block S13 compares the difference calculated in the block S12 with a predetermined reference value for each of the four divided areas. When the difference is greater than the predetermined reference value, the block S14 decides that a flicker is occurring in the present divided area. Otherwise, the block S14 decides that a flicker is absent from the present divided area. Thus, the block S14 generates flicker presence/absence information pieces for the four divided areas, respectively. The block S14 controls divided-area position data pieces Hstart and Vstart in response to the flicker presence/absence information pieces.

Specifically, when only one of the four divided areas has a flicker, the divided-area position data pieces Hstart and Vstart are held the same. When all the four divided areas have flickers, the divided-area position data pieces Hstart and Vstart are held the same. When none of the four divided areas has a flicker, the divided-area position data pieces Hstart and Vstart are held the same. When two of the four divided areas have flickers, the divided-area position data pieces Hstart and Vstart are changed to expand one of the two flickering divided areas. When three of the four divided areas have flickers, the divided-area position data pieces Hstart and Vstart are changed to expand an intermediate one of the three flickering divided areas. The control of the divided-area position data pieces Hstart and Vstart is to enable a flickering zone to be contained in only one of the four divided areas.

A block S15 subsequent to the block S14 outputs the divided-area position data pieces Hstart and Vstart to the field-division pulse generator 19. After the block S15, the current execution cycle of the program segment ends.

Fifth Embodiment

A fifth embodiment of this invention is similar to the first embodiment or the second embodiment thereof except for the following design change.

Figure 13:
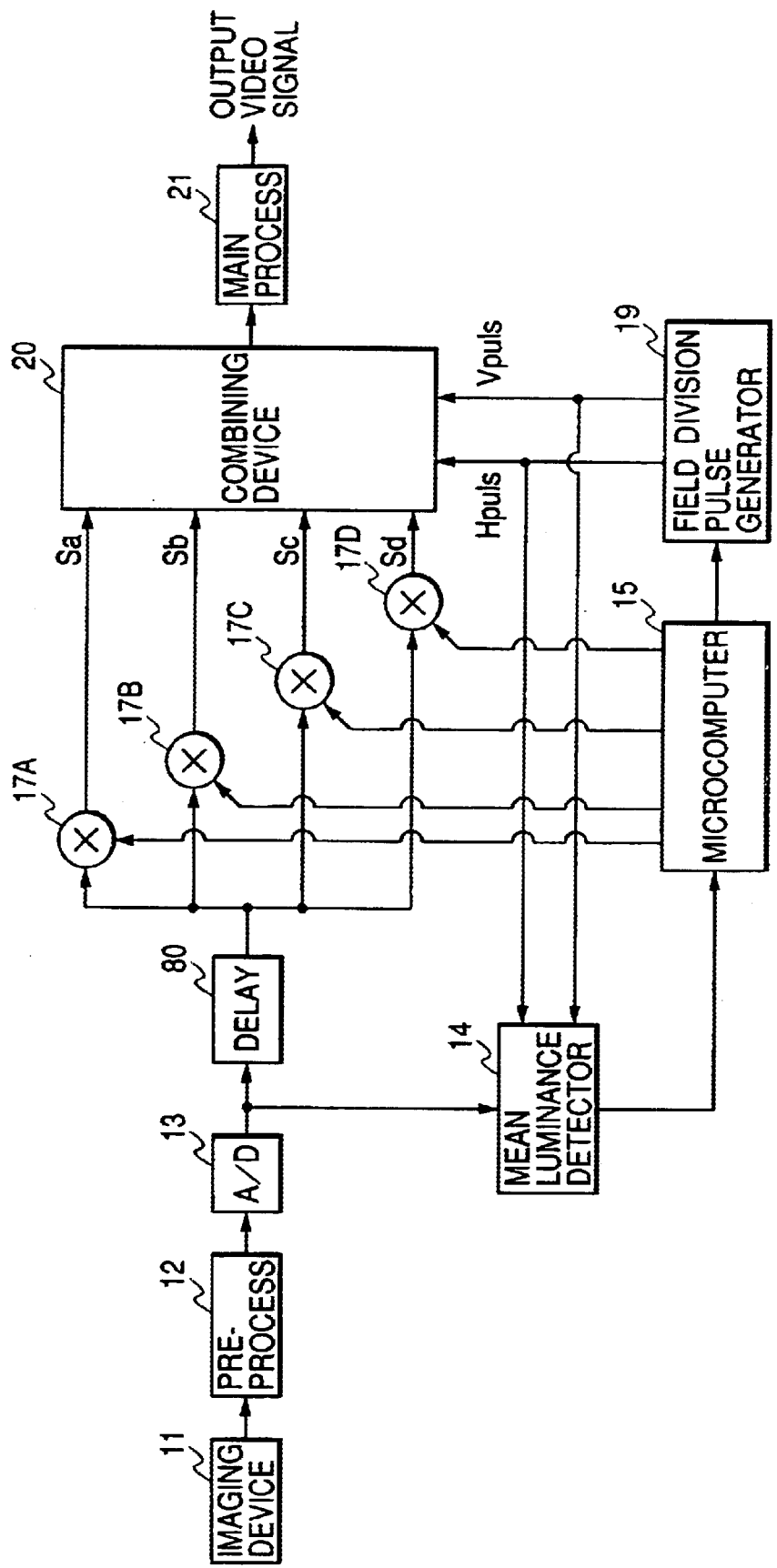
FIG. 13 is a block diagram of a solid-state imaging apparatus according to a fifth embodiment of this invention.

FIG. 13 shows a solid-state imaging apparatus according to the fifth embodiment of this invention. The solid-state imaging apparatus of FIG. 13 includes a delay circuit 80. The input terminal of the delay circuit 80 is connected to the output terminal of the A/D converter 13. The output terminal of the delay circuit 80 is connected to input terminals of the multipliers 17A, 17B, 17C, and 17D.

The delay circuit 80 provides a predetermined delay to the digital video signal transmitted to the multipliers 17A, 17B, 17C, and 17D. The delay circuit 80 compensates for a signal delay caused by the mean luminance detector 14 and the microcomputer 15 with respect to the signals of the desired gain factors applied to the multipliers 17A, 17B, 17C, and 17D.

Sixth Embodiment

A sixth embodiment of this invention is similar to the third embodiment thereof except for the following design change.

Figure 14:
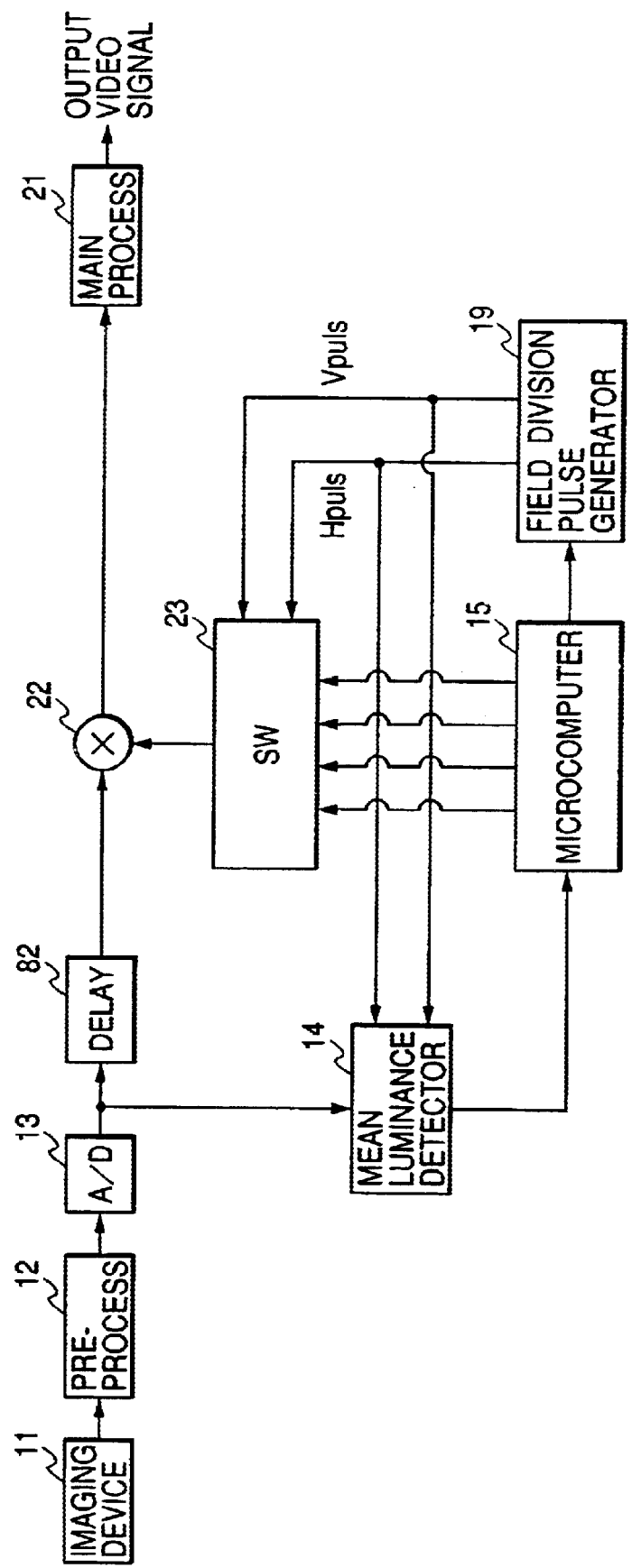
FIG. 14 is a block diagram of a solid-state imaging apparatus according to a sixth embodiment of this invention.

FIG. 14 shows a solid-state imaging apparatus according to the sixth embodiment of this invention. The solid-state imaging apparatus of FIG. 14 includes a delay circuit 82. The input terminal of the delay circuit 82 is connected to the output terminal of the A/D converter 13. The output terminal of the delay circuit 82 is connected to an input terminal of the multiplier 22.

The delay circuit 82 provides a predetermined delay to the digital video signal transmitted to the multiplier 22. The delay circuit 82 compensates for a signal delay caused by the mean luminance detector 14, the microcomputer 15, and the switch 23 with respect to the signal of the desired gain factor applied to the multiplier 22.

Seventh Embodiment

A seventh embodiment of this invention is similar to the fourth embodiment thereof except for the following design change.

Figure 15:
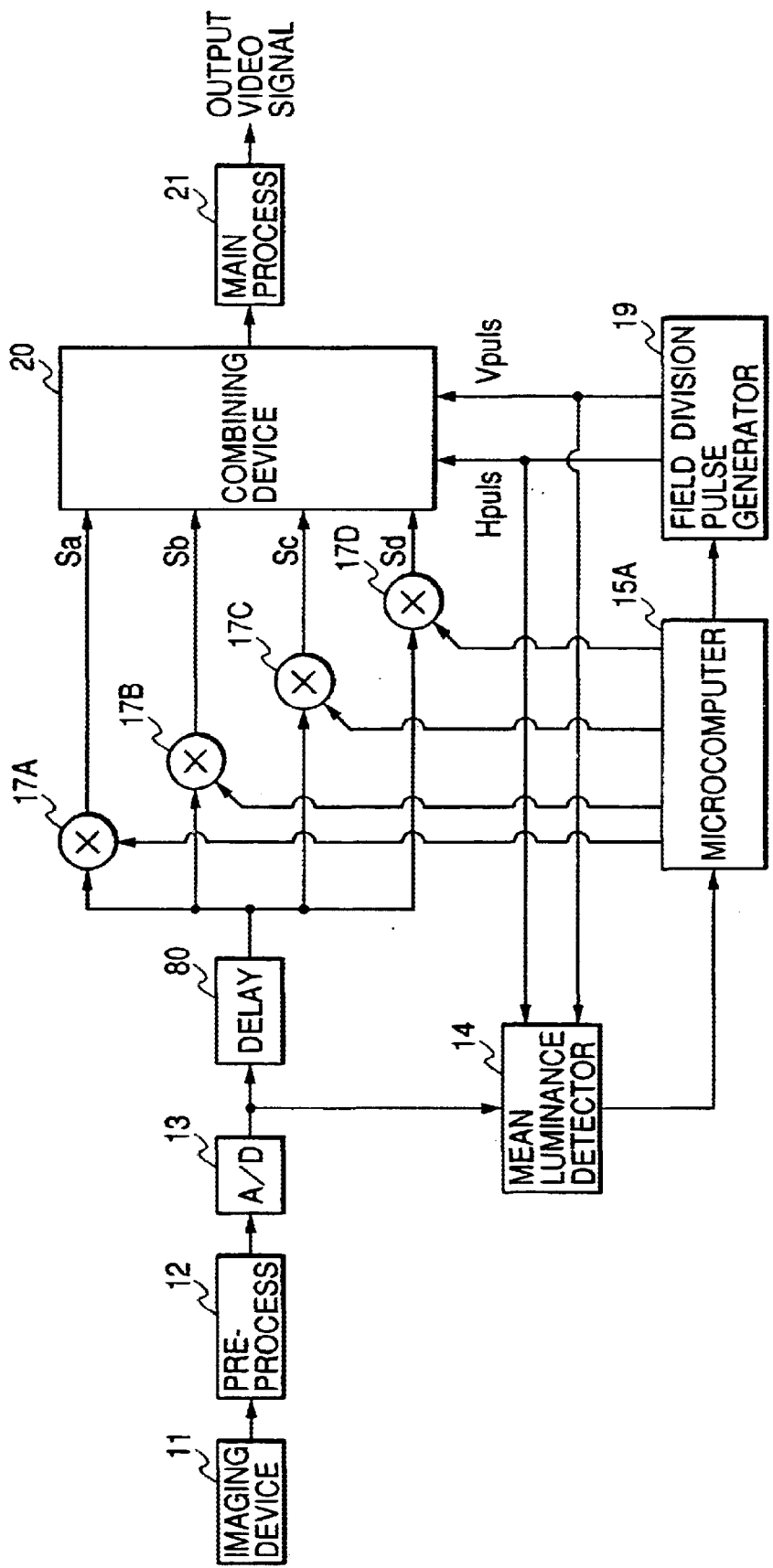
FIG. 15 is a block diagram of a solid-state imaging apparatus according to a seventh embodiment of this invention.

FIG. 15 shows a solid-state imaging apparatus according to the seventh embodiment of this invention. The solid-state imaging apparatus of FIG. 15 includes a delay circuit 80. The input terminal of the delay circuit 80 is connected to the output terminal of the A/D converter 13. The output terminal of the delay circuit 80 is connected to input terminals of the multipliers 17A, 17B, 17C, and 17D.

The delay circuit 80 provides a predetermined delay to the digital video signal transmitted to the multipliers 17A, 17B, 17C, and 17D. The delay circuit 80 compensates for a signal delay caused by the mean luminance detector 14 and the microcomputer 15A with respect to the signals of the desired gain factors applied to the multipliers 17A, 17B, 17C, and 17D.

What is claimed is:

1. An imaging apparatus comprising:

first means for generating at least one picture division signal;

second means for dividing every picture represented by a video signal into at least first and second areas in response to the picture division signal generated by the first means;

third means for detecting a mean luminance of the first area and a mean luminance of the second area;

fourth means for correcting a flicker in the first area to derive a first correction-resultant area in response to the mean luminance of the first area which is detected by the third means;

fifth means for correcting a flicker in the second area to derive a second correction-resultant area in response to the mean luminance of the second area which is detected by the third means; and sixth means for combining the first correction-resultant area and the second correction-resultant area into a correction-resultant picture.

2. An imaging apparatus as recited in claim 1, wherein the third means comprises means for detecting the mean luminance of the first and the mean luminance of the second areas in response to the picture division signal generated by the first means.

3. An imaging apparatus as recited in claim 1, wherein the fourth means comprises a first video amplifier for amplifying the video signal corresponding to the first area at a first gain, and means for controlling the first gain in response to the mean luminance of the first area which is detected by the third means, and wherein the fifth means comprises a second video amplifier for amplifying the video signal corresponding to the second area at a second gain, and means for controlling the second gain in response to the mean luminance of the second area which is detected by the third means.

4. An imaging apparatus as recited in claim 1, wherein the first means comprises means for setting the picture division signal to make inconspicuous a boundary between the first correction-resultant area and the second correction-resultant area in the correction-resultant picture.

5. An imaging apparatus as recited in claim 1, wherein the first means comprises means for setting the picture division signal to make movable a boundary between the first area and the second area.

6. An imaging apparatus as recited in claim 1, wherein the fourth means and the fifth means comprise a common video amplifier for amplifying the video signal at a controllable gain, means for, when the video signal corresponds to the first area, controlling the gain of the video amplifier in response to the mean luminance of the first area which is detected by the third means, and means for, when the video signal corresponds to the second area, controlling the gain of the video amplifier in response to the mean luminance of the second area which is detected by the third means.

7. An imaging apparatus as recited in claim 1, further comprising:

seventh means for deciding whether or not a flicker is present in the first area in response to the mean luminance of the first area which is detected by the third means;

eighth means for deciding whether or not a flicker is present in the second area in response to the mean luminance of the second area which is detected by the third means; and ninth means for controlling the picture division signal generated by the first means to move a boundary between the first area and the second area in response to a result of the decision by the seventh means and a result of the decision by the eighth means.

8. A video-signal processing circuit comprising:

first means for dividing every picture represented by a video signal into first and second areas;

second means for processing the video signal which corresponds to the first area to correct a flicker in the first area;

third means for processing the video signal which corresponds to the second area to correct a flicker in the second area;

fourth means for detecting whether or not a flicker is present in the first area;

fifth means for detecting whether or not a flicker is present in the second area; and sixth means for changing a boundary between the first area and the second area in response to a result of the detection by the fourth means and a result of the detection by the fifth means.

* * * * *